Oct. 3, 1939.  R. H. LEGGETT  2,174,944
VEHICLE WHEEL TRACTION MEANS
Filed Nov. 16, 1937  2 Sheets—Sheet 1
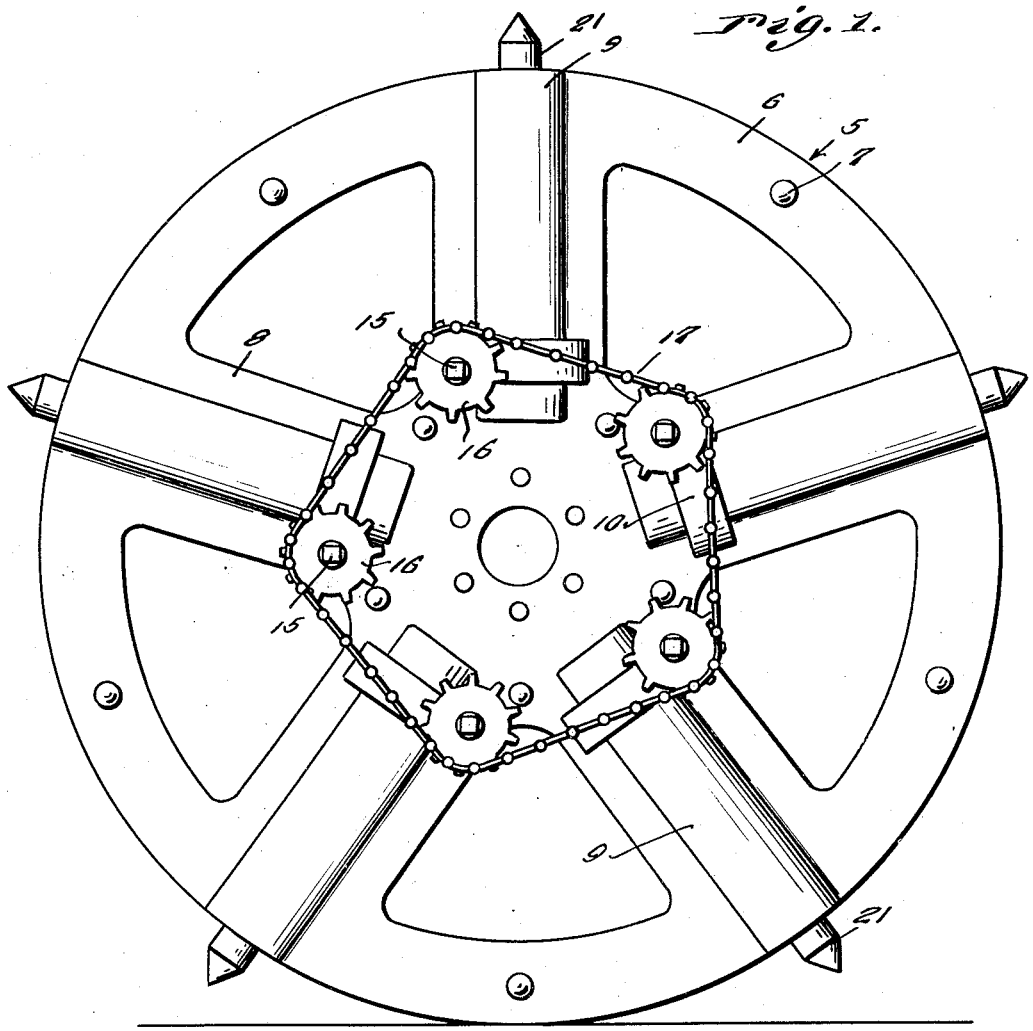
Inventor
*R. H. Leggett*
By *Clarence A. O'Brien*
*Hyman Berman*
Attorneys Oct. 3, 1939. R. H. LEGGETT 2,174,944
VEHICLE WHEEL TRACTION MEANS
Filed Nov. 16, 1937 2 Sheets-Sheet 2
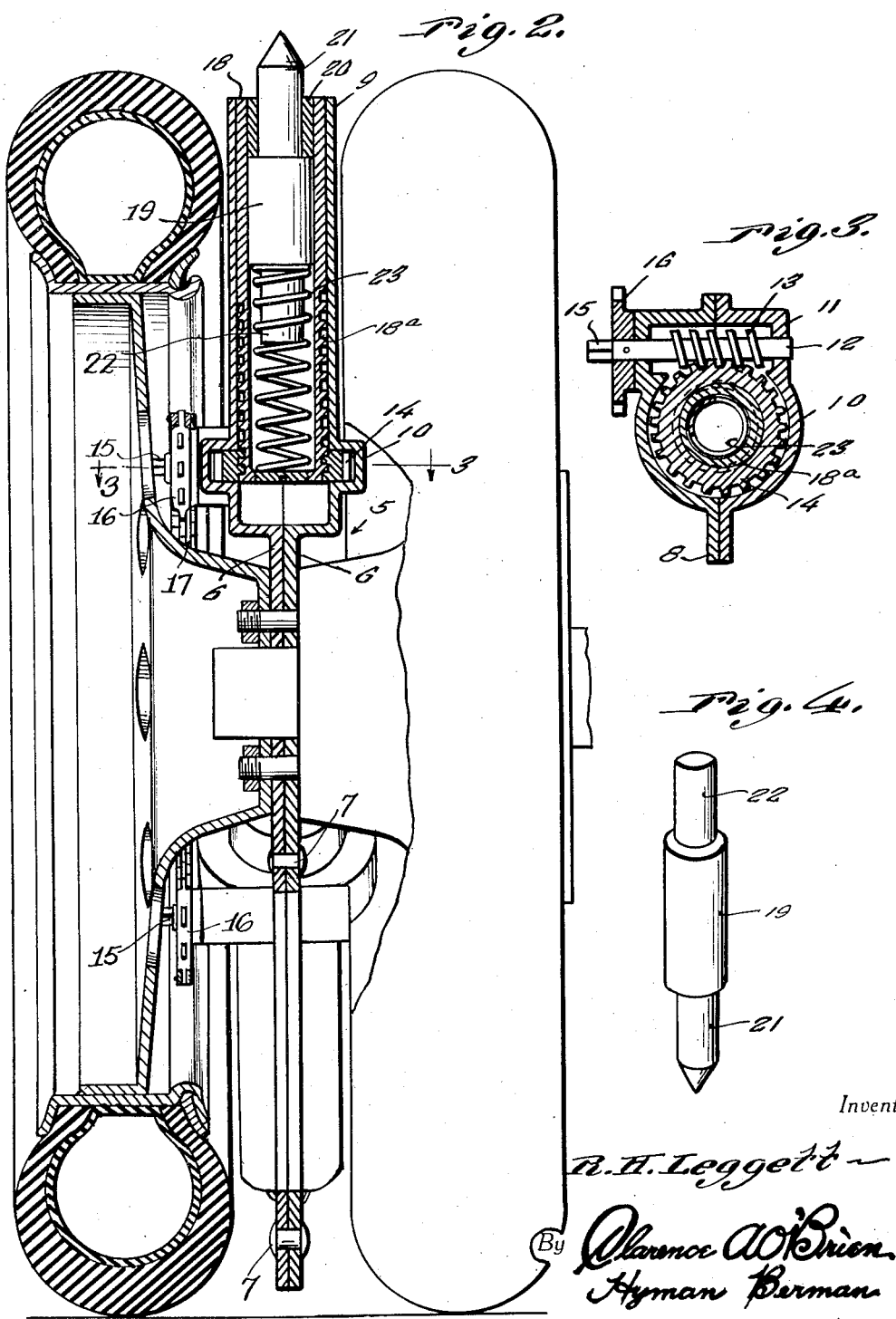

Patented Oct. 3, 1939

2,174,944

UNITED STATES PATENT OFFICE 2,174,944

VEHICLE WHEEL TRACTION MEANS

Rae H. Leggett, Toledo, Ohio

Application November 16, 1937, Serial No. 174,885

3 Claims. (Cl. 301—47)

This invention relates to an anti-skid and traction device for use in association with vehicle wheels and it has more particular reference to what may be called a built-in or permanently attached structure susceptible of advantageous coordination with double tired wheels of the types used on trucks, busses and the like.

The preferred embodiment of the invention is exemplified in a structure which is interposed between the inner and outer pneumatic tires, said structure having projectible and retractable traction elements capable of being maintained in receding ineffective position, or projected beyond the tread portion of the tires for emergency use.

In reducing to practice the preferred embodiment of the invention I have developed what is believed to be a comparatively simple and reliable structural assemblage, characterized primarily by yieldably mounted receding calks, said calks being adjustably mounted in the main supporting or foundation frame.

Other features and advantages will become more readily apparent from the following description and drawings.

In the drawings:

Figure 1 is a side elevational view of the invention per se in readiness for incorporation in a vehicle wheel structure.

Figure 2 is a fragmentary view in section and elevation showing how the invention may be incorporated in the twin tire equipped wheel construction.

Figure 3 is a horizontal section on the line 3—3 of Figure 2.

Figure 4 is a perspective view of the spring pressed anti-skid calk or plunger member.

The main supporting frame or foundation is indicated as a unit by the numeral 5. Preferably this comprises a pair of ring-like plates 6 riveted or otherwise secured together as at 7. The radial spoke portions 8 are provided with semi-cylindrical adapters 9 which are brought together in pairs to define casings for the bodily adjustable anti-skid units to be hereinafter described. It will be observed that the inner end of the casings are enlarged as at 10 and on one side are provided with laterally off-set companion portions 11. These features 10 and 11 serve to accommodate several coordinated features. For example, there is a shaft or axle 12 journaled for rotation in bearings in the part 11 and this is formed with worm threads 13 meshing with associated teeth or what may be called a ring nut 14. The outer end of the shaft 12 is of polygonal form as at 15 to accommodate a wrench or other tool (not shown). Keyed thereon is a sprocket wheel 16 to accommodate the surrounding sprocket chain 17 (see Figure 1). By thus turning any one of the shafts 12 the sprocket chain serves to simultaneously turn the remaining shafts through the medium of the associated sprocket wheels.

Each calk or plunger unit comprises a radially projectible and retractable cylinder 18. The plunger 19 is mounted for reciprocation therein and its shouldered outer end is engageable with a stop forming bushing 20 fitted in the outer end of the cylinder. That part of the plunger indicated at 21 and projecting beyond the stop collar or bushing 20 is pointed to provide the desired anti-slipping ground engaging calk. The inner reduced end or stem 22 of the plunger is surrounded by a coiled spring 23 of the expansion type. Also the inner end of the cylinder is threaded externally to accommodate the adjusting nut 14. Consequently, when the nut is turned in one direction the entire cylinder and plunger assembly, as a unit, is fed into the receiving barrel or casing 9.

Normally, all of the circumferentially spaced radially projectible calks or anti-slipping units are confined in the barrel like adapter casings in the frame structure. When in this position the calk elements 21 are substantially flush with the outer ends of said casings. When conditions are such as to require the use of traction or anti-skid means the sprocket chain is brought into operation through the use of a tool in the manner already described and all of the calk units are projected to the usable position seen in Figure 2. When they are in the latter position it is evident that the calks are spring pressed and therefore sufficiently yieldable to render them self adapting to irregularities in the surface traversed, whereby to guard against easy destruction or breakage.

Manifestly, by incorporating in a wheel structure an anti-skid attachment of the type disclosed, means is always readily available to be brought into effective play when needed. Since the structure and operation is, however, quite simple, an elaborate description is presumably not necessary.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A device of the class described comprising a pair of circular plates fastened together, said plates being fashioned at circumferentially spaced points to provide radial casings, said casings being substantially cylindrical, cylinders mounted in the casings, spring-pressed plungers mounted in the cylinders, and adjusting means mounted on the plates and cooperable with the cylinders to project and retract the same in unison as described.

2. In a structure of the class described, a duplex vehicle wheel embodying a two-part frame structure, each part including a circular plate, the central portion of said plates being flat and in contact with each other and secured together, said plates being provided at circumferentially spaced points with radially disposed cylindrical casings, the inner end portion of each casing being radially enlarged in diameter to provide an adapter for a pinion nut, a cylinder mounted in each casing for slidable retraction and projection, the inner end of the cylinder being screw threaded, a pinion nut on said screw threaded portion, the toothed peripheral edge of said nut being lodged in the adjacent adapter, a spring pressed plunger mounted in said cylinder, a worm mounted for rotation in each adapter and having operating connection with the teeth on said pinion, a sprocket wheel mounted on the shaft of each worm, and a unitary adjusting chain, said chain being endless and surrounding the respective sprockets.

3. In a structure of the class described, a duplex vehicle wheel structure embodying a two-part frame structure, each part including a circular plate, the central portion of said plate being flat and in contact with each other and secured together, said plate being provided at circumferentially spaced points with radially disposed cylindrical casings, the inner end portion of each casing being radially enlarged in diameter to provide an adapter for a pinion nut, a cylinder mounted in each casing for slidable retraction and projection, the inner end of the cylinder being screw threaded, a pinion nut on said screw threaded portion, the toothed peripheral edge of said nut being lodged in the adjacent adapter, a spring pressed plunger mounted in said cylinder, a worm mounted for rotation in each adapter and having operating connection with the teeth of said pinion, a sprocket wheel mounted on the shaft of each worm, and a unitary adjusting chain, said chain being endless and surrounding the respective sprockets, the aforesaid wheel structure including a tire and hub assembly, the respective hub structures being disposed in opposed relation and secured to the flat central portions of said plates at points spaced inwardly of the respective casings, and said casings cooperating with the tread portion of the tires.

RAE H. LEGGETT.